US012572512B2

(12) United States Patent
Yerfule et al.

(10) Patent No.: US 12,572,512 B2
(45) Date of Patent: *Mar. 10, 2026

(54) SYNCHRONIZING AN EXTERNAL LOCATION

(71) Applicant: Dropbox, Inc., San Francisco, CA (US)

(72) Inventors: Sourabh Yerfule, Sunnyvale, CA (US);
Parker Timmerman, Jersey City, NJ
(US); Adam Arbree, Fairfax, CA (US);
Pranav Vishnu Ramabhadran, San
Francisco, CA (US); Zihao Yang, San
Francisco, CA (US); Lisa Fan, San
Francisco, CA (US); Kelson Reiss, San
Francisco, CA (US); Geoffry Song, San
Francisco, CA (US); **Nipunn
Koorapati**, San Francisco, CA (US)

(73) Assignee: Dropbox, Inc., San Francisco, CA (US)

( * ) Notice: Subject to any disclaimer, the term of this
patent is extended or adjusted under 35
U.S.C. 154(b) by 180 days.

This patent is subject to a terminal dis-
claimer.

(21) Appl. No.: 18/105,628

(22) Filed: Feb. 3, 2023

(65) Prior Publication Data

US 2023/0177017 A1 Jun. 8, 2023

Related U.S. Application Data

(63) Continuation of application No. 17/855,842, filed on
Jul. 1, 2022, now Pat. No. 11,586,590, which is a
(Continued)

(51) Int. Cl.
*G06F 16/178* (2019.01)
*G06F 3/0482* (2013.01)
(Continued)

(52) U.S. Cl.
CPC .......... *G06F 16/178* (2019.01); *G06F 3/0482*
(2013.01); *G06F 16/168* (2019.01);
(Continued)

(58) Field of Classification Search
CPC .................................................... G06F 16/178
(Continued)

(56) References Cited

U.S. PATENT DOCUMENTS

| | | | |
|---|---|---|---|
| 8,458,127 B1 * | 6/2013 | Lorch, III | ........... G06F 11/1456 |
| | | | 707/661 |
| 8,706,692 B1 * | 4/2014 | Luthra | .................... G06F 16/27 |
| | | | 707/622 |

(Continued)

OTHER PUBLICATIONS

Anonymous, "How Do I Sync Folders Outside of the Sync Folder
on Windows?," May 31, 2016, 4 pages.
(Continued)

*Primary Examiner* — Reza Nabi

(74) *Attorney, Agent, or Firm* — Keller Preece PLLC

(57) ABSTRACT

The present technology pertains to synchronizing contents
of a directory external to a synchronized directory by a
content management system. The content management sys-
tem is configured to synchronize only objects in the syn-
chronized directory. Accordingly, the present technology
creates an anchor object that represents the directory exter-
nal to the synchronized directory within the synchronized
directory. The anchor object includes special attributes that
indicate to the synchronization client that the anchor object
represents an external directory, and allows the contents of
that directory to be synchronized directly to a server on the
content management system without first storing the con-
tents of the external directory on the hard drive of the client
device.

17 Claims, 11 Drawing Sheets

Related U.S. Application Data continuation of application No. 17/132,954, filed on Dec. 23, 2020, now Pat. No. 11,392,554.

(60) Provisional application No. 63/093,699, filed on Oct. 19, 2020.

(51) Int. Cl.

| | |
|---|---|
| *G06F 16/16* | (2019.01) |
| *G06F 16/27* | (2019.01) |
| *H04L 67/1095* | (2022.01) |
| *H04L 67/1097* | (2022.01) |

(52) U.S. Cl.
CPC .......... *G06F 16/27* (2019.01); *H04L 67/1095* (2013.01); *H04L 67/1097* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 9,300,609 | B1 * | 3/2016 | Beausoleil | H04L 63/08 |
| 9,430,163 | B1 * | 8/2016 | Albertson | G06F 3/0658 |
| 9,432,457 | B2 * | 8/2016 | Marano | G06F 16/178 |
| 9,479,567 | B1 * | 10/2016 | Koorapati | G06F 16/178 |
| 9,519,655 | B2 * | 12/2016 | Ohno | H04L 67/565 |
| 9,537,952 | B1 * | 1/2017 | Koorapati | G06F 16/182 |
| 9,646,010 | B2 * | 5/2017 | Mokhtarzada | G06F 16/122 |
| 9,792,452 | B2 * | 10/2017 | Tan | G06F 21/62 |
| 10,180,883 | B2 | 1/2019 | Mokhtarzada et al. | |
| 10,298,675 | B2 * | 5/2019 | Ryder | G06F 9/4856 |
| 10,324,903 | B1 * | 6/2019 | Goldberg | H04L 63/0853 |
| 10,642,516 | B2 * | 5/2020 | Arnold | G06F 3/0643 |
| 10,708,340 | B2 * | 7/2020 | Eda | H04L 67/10 |
| 10,860,540 | B1 * | 12/2020 | Ugur-Ozekinci | G06F 11/1461 |
| 11,586,590 | B2 * | 2/2023 | Yerfule | G06F 16/192 |
| 2003/0225795 | A1 * | 12/2003 | Abdallah | G06F 16/10 |
| 2004/0089795 | A1 * | 5/2004 | Spencer | G11B 27/005 |
| 2004/0107206 | A1 * | 6/2004 | Heikell | G06F 16/27 |
| | | | | 707/999.102 |
| 2005/0228832 | A1 * | 10/2005 | Ghotge | G06F 11/0751 |
| 2008/0168183 | A1 * | 7/2008 | Marcy | G06F 16/178 |
| | | | | 709/248 |
| 2009/0198835 | A1 * | 8/2009 | Madhusudanan | G06F 16/27 |
| | | | | 709/248 |
| 2012/0185518 | A1 * | 7/2012 | Giampaolo | G06F 16/1794 |
| | | | | 707/821 |
| 2013/0151850 | A1 * | 6/2013 | Bugenhagen | H04L 63/10 |
| | | | | 709/228 |
| 2013/0268740 | A1 * | 10/2013 | Holt | G06F 21/00 |
| | | | | 711/163 |
| 2013/0311597 | A1 * | 11/2013 | Arrouye | G06F 9/5072 |
| | | | | 709/217 |
| 2014/0172931 | A1 * | 6/2014 | Tokita | G06F 16/16 |
| | | | | 707/829 |
| 2014/0188808 | A1 * | 7/2014 | Wolf | G06F 16/21 |
| | | | | 707/654 |
| 2014/0279873 | A1 * | 9/2014 | Somerfield | G06F 16/172 |
| | | | | 707/610 |
| 2014/0317058 | A1 * | 10/2014 | Chang | G06F 13/385 |
| | | | | 707/640 |
| 2015/0026222 | A1 * | 1/2015 | Litzenberger | G06F 16/152 |
| | | | | 707/804 |
| 2015/0207844 | A1 * | 7/2015 | Tataroiu | H04L 67/1095 |
| | | | | 709/219 |
| 2015/0244798 | A1 * | 8/2015 | Bolotin | H04L 67/1097 |
| | | | | 709/217 |
| 2015/0269203 | A1 * | 9/2015 | Baldwin | G06F 16/2228 |
| | | | | 707/741 |
| 2015/0301764 | A1 * | 10/2015 | Tang | G06F 11/1456 |
| | | | | 710/74 |
| 2015/0317098 | A1 * | 11/2015 | Kao | H04W 4/023 |
| | | | | 710/33 |
| 2016/0028796 | A1 * | 1/2016 | Garcia | H04L 67/06 |
| | | | | 715/738 |
| 2017/0124170 | A1 * | 5/2017 | Koorapati | G06F 16/27 |
| 2017/0192707 | A1 * | 7/2017 | Arnold | G06F 3/0632 |
| 2018/0181581 | A1 * | 6/2018 | Condict | G06F 16/13 |
| 2019/0012385 | A1 * | 1/2019 | Slepichko | H04L 67/06 |
| 2019/0205401 | A1 | 7/2019 | Kleinpeter et al. | |
| 2019/0208014 | A1 | 7/2019 | Goldberg et al. | |
| 2019/0243801 | A1 * | 8/2019 | Steiner | G06F 16/113 |
| 2020/0034372 | A1 * | 1/2020 | Ozzie | H04W 4/02 |
| 2020/0301884 | A1 * | 9/2020 | Eom | G06F 16/13 |
| 2020/0311028 | A1 * | 10/2020 | Korepanov | G06F 16/183 |
| 2021/0200720 | A1 * | 7/2021 | Ramabhadran | H04L 67/1095 |
| 2021/0326249 | A1 * | 10/2021 | Araki | G11B 25/06 |
| 2022/0179939 | A1 * | 6/2022 | Drepper | G06F 21/44 |

OTHER PUBLICATIONS

Communication Pursuant to Article 94(3) EPC for European Application No. 21749484.8 mailed on Jul. 11, 2023, 6 pages.

Anonymous., "How Do I Sync Folders Outside of the Sync Folder on Windows?" May 31, 2016, XP055854822, Retrieved from the Internet: https://web.archive.org/web/20160531211600/https://www.sync.com/help/how-do-i-sync-folders-outside-of-the-sync-folder-on-windows/, 9 pages.

International Search Report and Written Opinion for PCT Application No. PCT/US2021/041107 dated Nov. 11, 2021, 9 pages.

Jane, Response to the Discussion on "Backing Up and Syncing from external HD to the Dropbox Folder Issues" Published on Oct. 25, 2018, Retrieved from https://www.dropboxforum.com/15/Dropbox-installs-integrations/Backing-up-and-syncing-from-external-HD-to-the-Dropbox-folder/td-p/305453, 18 pages.

Non-Final Office Action from U.S. Appl. No. 17/133,006, mailed Jul. 6, 2022, 11 pages.

Notice of Allowance from U.S. Appl. No. 17/132,954, mailed Apr. 15, 2022, 17 pages.

Notice of Allowance from U.S. Appl. No. 17/133,006, mailed Dec. 16, 2022, 02 pages.

Notice of Allowance from U.S. Appl. No. 17/133,006, mailed on Dec. 8, 2022, 12 pages.

Notice of Allowance from U.S. Appl. No. 17/855,842, mailed Jan. 19, 2023, 2 pages.

Notice of Allowance from U.S. Appl. No. 17/855,842, mailed Nov. 30, 2022, 11 pages.

Haynes T., et al., "NFS Version 4 Protocol; draft-ietf-nfsv4-rfc3530bis-06.txt," Internet Engineering Task Force (IETF); Standard Working Draft, Internet Society (ISOC), No. 6, Feb. 16, 2011 [Retrieved on Feb. 17, 2011], pp. 1-301, XP015073997.

Preliminary Opinion of the Examining Division for European Application No. 21749484.8 mailed on Aug. 13, 2024, 9 pages.

Result of Consultation for European Application No. 21749484.8 mailed on Sep. 5, 2024, 11 pages.

Anonymous, "Desktop Client Tips: How to Add a Folder Sync Connection," Sep. 20, 2020, 4 pages, Retrieved from the Internet: URL: https://web.archive.org/web/20200920085512/https://owncloud.com/news/desktop-client-tips-how-to-add-a-folder-syncconnection/.

Summons to attend oral proceedings pursuant to Rule 115(1) EPC for European Application No. 21749484.8 mailed on Jan. 18, 2024, 9 pages.

Extended European Search Report for European Application No. 23161899.2 dated Jun. 1, 2023, 7 pages.

International Preliminary Report on Patentability for PCT Application No. PCT/US2021/041107, dated May 4, 2023, 8 pages.

Notice of Acceptance for Australian Application No. 2023201603 mailed on May 4, 2023, 3 pages.

Office Action for European Application No. 21749484.8 mailed on Feb. 27, 2025, 60 pages.

(56)           References Cited

OTHER PUBLICATIONS

Office Action for European Application No. 21749484.8 mailed on
Oct. 8, 2024, 61 pages.

* cited by examiner

300

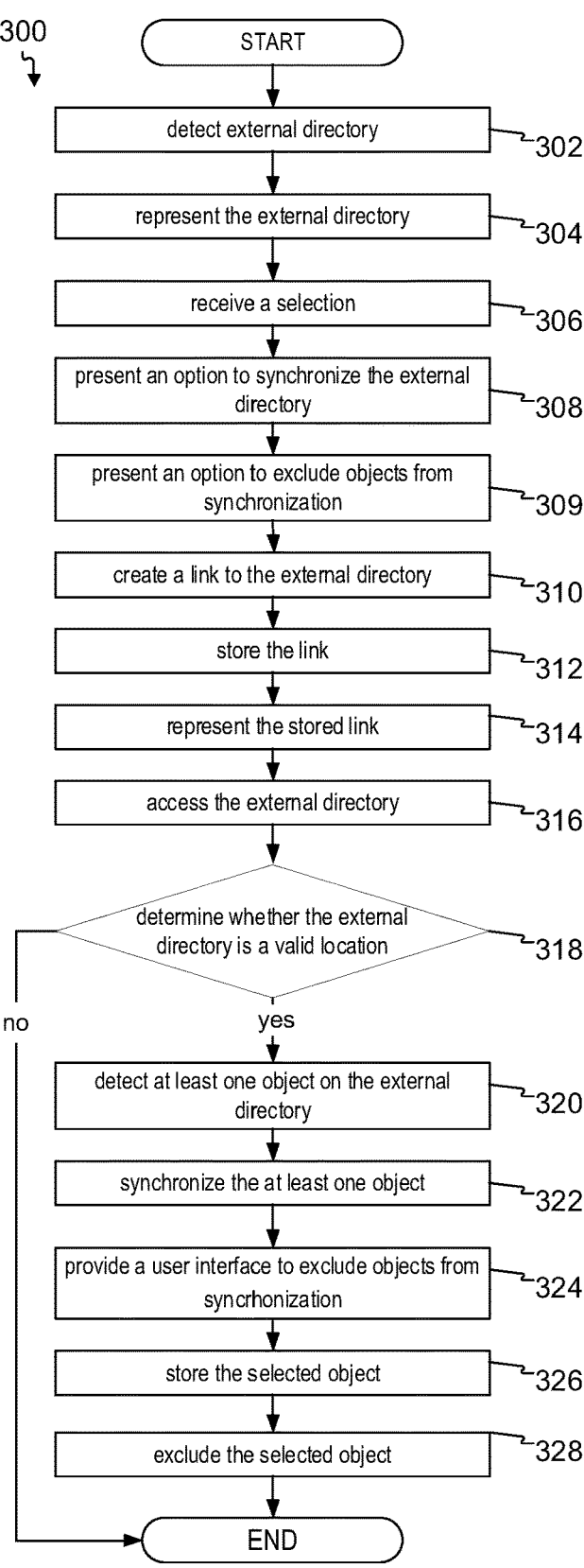

START detect external directory 302 represent the external directory 304 receive a selection 306 present an option to synchronize the external directory 308 present an option to exclude objects from synchronization 309 create a link to the external directory 310 store the link 312 represent the stored link 314 access the external directory 316 determine whether the external directory is a valid location 318 no                yes detect at least one object on the external directory 320 synchronize the at least one object 322 provide a user interface to exclude objects from syncrhonization 324 store the selected object 326 exclude the selected object 328

END

START generate an anchor object ⌐410 recognize the anchor object ⌐420 read the special attributes ⌐430 determine information of the external folder using the attributes ⌐440 create an in-memory map ⌐450 read contents of external directory ⌐460 synchronize at least one object ⌐470

END

500

START receive a synchronization request ~505 represent the anchor object ~510 receive a selection of a child object ~515 receive an edit of the child object ~525 determine the child object is configured for uni-directional synchronization ~530 provide a warning ~535 receive an input ~540 create a copy ~545 synchronize the copy ~550

END

SYNCHRONIZING AN EXTERNAL LOCATION

CROSS-REFERENCE TO RELATED APPLICATIONS

This application is a continuation and claims the benefit of U.S. application Ser. No. 17/855,842, filed on Jul. 1, 2022, entitled "SYNCHRONIZING AN EXTERNAL LOCA-TION," which is a continuation and claims the benefit of U.S. application Ser. No. 17/132,954, filed on Dec. 23, 2020, entitled "SYNCHRONIZING AN EXTERNAL LOCA-TION," which claims priority to U.S. Provisional Patent Application No. 63/093,699, filed on Oct. 19, 2020, entitled "SYNCHRONIZING AN EXTERNAL LOCATION." All of which are expressly incorporated by reference herein in their entireties.

BACKGROUND

Content management systems allow users to store and manage all necessary content items in one place. Content management systems generally store content items on serv-ers and allow users access to the content items over a network. Some content management systems allow users to synchronize content items stored on the local client device to the content management system. However, content man-agement systems do not offer synchronization of content items stored on an external drive attached to a client device.

BRIEF DESCRIPTION OF THE DRAWINGS

FIG. 3A is a flowchart of a method for synchronizing an external location in accordance with some embodiments;

DETAILED DESCRIPTION

The present technology is capable of synchronizing objects that are located outside of a synchronized directory of a content management system. Content management systems that provide for synchronization between cloud storage and a client device synchronize contents into a particular directory on the client device. Objects located outside of a synchronized directory are typically not acces-sible to a synchronization service of a content management system. However, some of a user's most important objects might be located outside of the synchronized directory and therefore there is a need to be able to synchronize such content items.

Objects stored in an external directory on an external hard drive present an even bigger challenge, and yet objects on an external hard drive might be some of a user's most important to backup through a synchronized content management system. For example, users commonly utilize external hard drives to archive important objects that are not needed on a daily basis, but are none the less important. External hard drives provide complications in that such hard drives might not always be accessible to a computer running a synchro-nization client application, they might be formatted differ-ently than the hard drive of the client device, and they might be read-only.

A further problem can arise when an external hard drive stores a greater amount of bytes than the available storage space on a client computer's hard drive. In such instances, objects cannot be first stored on the hard drive of the client prior to being uploaded to a synchronized content manage-ment system.

The present technology overcomes many of these prob-lems and allows for an external directory, even on external hard drives, to be synchronized to a content management system without first copying the objects to be synchronized to a location on a client device's hard drive.

Figure 1:
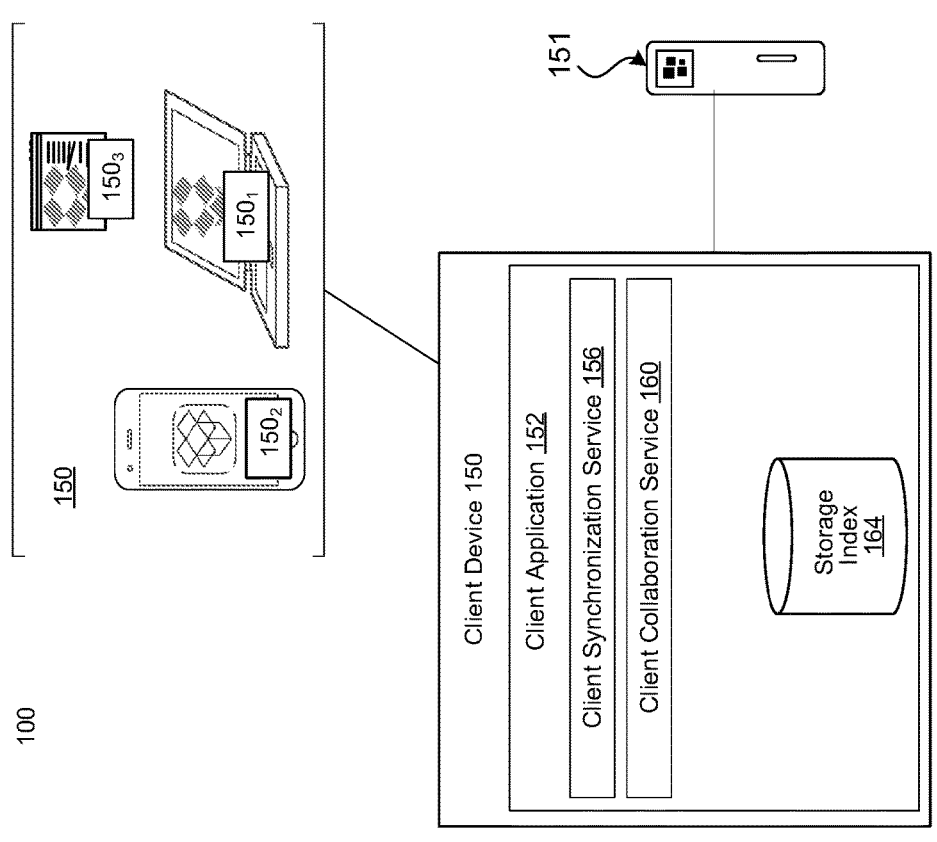
FIG. 1 shows an example system configuration, which depicts a content management system interacting with a client device in accordance with some embodiments.
Figure 1:
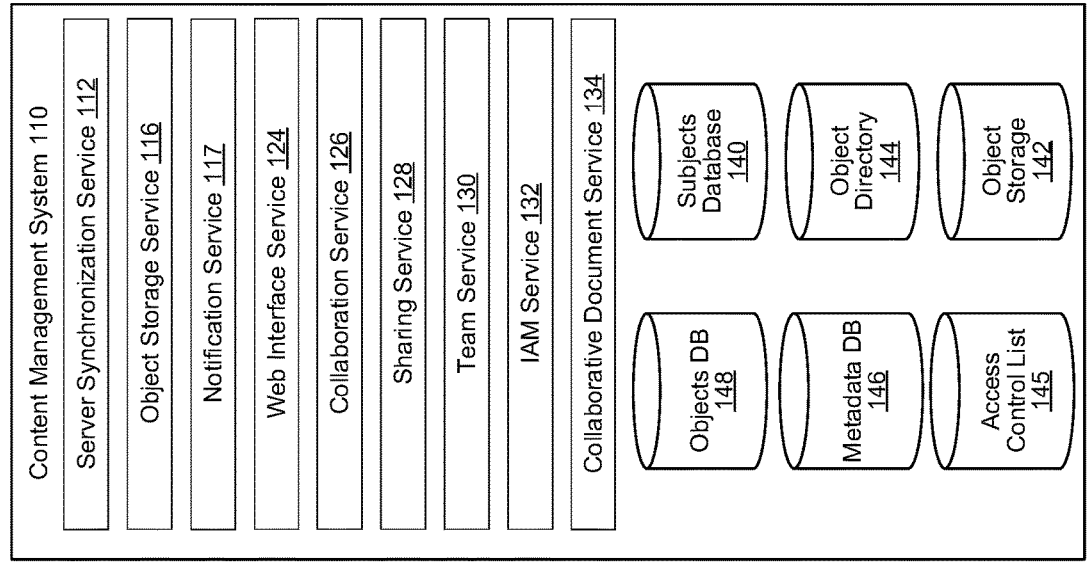

In some embodiments, the disclosed technology is deployed in the context of a content management system having object synchronization capabilities and collaboration features, among others. An example system configuration 100 is shown in FIG. 1, which depicts content management system 110 interacting with a client device 150.

Accounts

Content management system 110 can store objects in association with accounts, as well as perform a variety of object management tasks, such as retrieve, modify, browse, and/or share the object(s). Furthermore, content manage-ment system 110 can enable an account to access object(s) from multiple client devices.

Content management system 110 supports a plurality of accounts. A subject (user, group, team, company, etc.) can create an account with content management system 110, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g., various tiers of free or paid accounts), storage space allocated, storage space used, client devices 150 having a registered content management client application 152 resident thereon, security settings, personal configura-tion settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata data-base 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, directories, folders, zip files, playlists, albums, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in content directory 144. Additionally, data regarding changes, access, etc. can be stored in object database 148. Object database 148 can also include a subject account identifier that identifies the subject IDs that have access to the object.

In some embodiments, object database 148 can be broken into a plurality of tables, indexes and other data structures.

Each of the various storages/databases such as object storage 142, content directory 144, object database 148, and metadata database 146 can be comprised of more than one such storage or database and can be distributed over many devices and locations. Other configurations are also possible. For example, data from object storage 142, content directory 144, object database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in content directory 144. Content directory 144 can include a content entry for each object stored in object storage 142. The content entry can be associated with an object ID, which identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a content path for an object in object database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived.

While objects are stored in object storage 142 in blocks and may not be stored under a tree like directory structure, such directory structure is a comfortable navigation structure for subjects. Object storage service 116 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. As addressed above, the directory structure is merely a comfortable navigation structure for subjects, but does not correlate to storage locations of objects in object storage 142.

While the directory structure in which an account views objects does not correlate to storage locations at content management system 110, the directory structure can correlate to storage locations on client device 150 depending on the file system used by client device 150.

As addressed above, a content entry in content directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object and content directory 144 can include a pointer or other mechanism to link the duplicates to the single copy.

Object storage service 116 can also store metadata describing objects, object types, folders, file paths, and/or the relationship of objects to various accounts, collections, or groups in metadata database 146, in association with the object ID of the object.

Object storage service 116 can also store a log of data regarding changes, access, etc. in object database 148. Object database 148 can include the object ID of the object and can optionally include a description of the change or access action along with a time stamp or version number and any other relevant data. Object database 148 can also include pointers to blocks affected by the change or object access. Object storage service can provide the ability to undo operations, by using an object version control that tracks changes to objects, different versions of objects (including diverging version trees), and a change history that can be acquired from object database 148.

Object Synchronization

Another feature of content management system 110 is the synchronization of objects with at least one client device 150. Client device(s) can take different forms and have different capabilities. For example, client device 150-1 is a computing device having a local file system accessible by multiple applications resident thereon. Client device 150-2 is a computing device wherein objects are only accessible to a specific application or by permission given by the specific application, and the objects are typically stored either in an application specific space or in the cloud. Client device 150-3 is any client device accessing content management system 110 via a web browser and accessing objects via a web interface. While example client devices 150-1, 150-2, and 150-3 are depicted in form factors such as a laptop, mobile device, or web browser, it should be understood that the descriptions thereof are not limited to devices of these example form factors. For example, a mobile device such as client 150-2 might have a local file system accessible by multiple applications resident thereon, or client 150-2 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In some embodiments, client device 150 can be communicatively connected to an external hard drive 151.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (new, deleted, modified, copied, or moved objects) to objects in a designated directory of a file system of client device 150 that is monitored by synchronization service 156.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor a designated directory on client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116 including functions addressed above such as dividing the object into blocks, hashing the object to generate a unique identifier, etc. Client synchronization service 156 can index content within client storage index 164 and save the result in storage index 164. Indexing can include storing paths plus the object identifier, and a unique client identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update object database 148, metadata database 146, content directory 144, object storage 142, subject database 140, etc. as appropriate.

When synchronizing from content management system 110 to client device 150, data regarding a mount, modification, addition, deletion, move of an object recorded in object database 148 can trigger a notification to be sent to client device 150 using notification service 117. When client device 150 is informed of the change, client device 150 can make a request for changes listed in object database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remaining portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

Collaboration Features

Another feature of content management system 110 is to facilitate collaboration between subjects. Collaboration features include object sharing, commenting on objects, co-working on objects, instant messaging, providing presence, and seen state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform-agnostic manner. That is, the content can be shared across multiple client devices 150 of varying types, capabilities, operating systems, etc. The content can also be shared across varying types of subject accounts.

To share an object within content management system 110 sharing service 128 can add a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include the account identifier and the content path or an object identifying code in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 ensures that a subject account attempting to access an object has appropriate rights to access the object. IAM service 132 can receive a token from client application 152 that follows a request to access a namespace and can return the capabilities permitted to the subject account. For subject accounts with multiple levels of access (e.g., a subject account with subject rights and administrator rights) IAM service 132 can also require explicit privilege escalation to avoid unintentional actions by administrators.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and object database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject that he has been mentioned in the comment. Various other object events can trigger notifications, including deleting an object, sharing an object, etc.

Collaboration service 126 can provide a messaging platform whereby subjects can send and receive instant messages, voice calls, emails, etc.

Collaboration Objects

In some embodiments, content management service can also include Collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects to access an object through a web interface and there they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above-addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account, and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third-party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
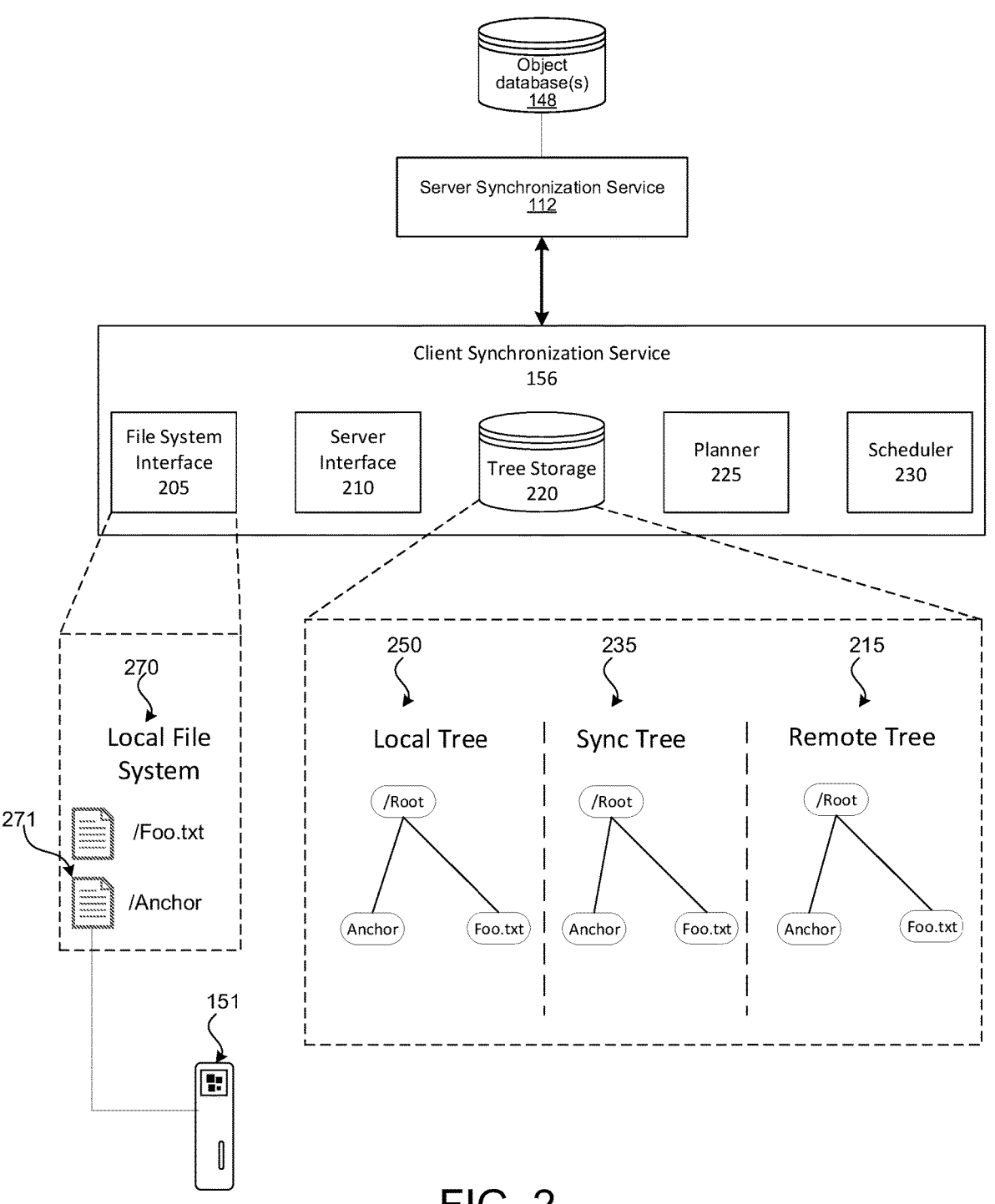
FIG. 2 shows an example of a client synchronization service in accordance with some embodiments.

FIG. 2 shows an example of a client synchronization service 156, in accordance with some embodiments. Client synchronization service 156 may be implemented in the client device 150 of FIG. 1. However, in some embodiments, client synchronization service 156 may be implemented on another computing device. Client synchronization service 156 is configured to synchronize changes to objects between content management system 110 and the client device 150 on which client synchronization service 156 runs.

Client synchronization service 156 may include file system interface 205, server interface 210, tree storage 220, planner 225, and scheduler 230. Additional or alternative components may also be included.

File system interface 205 is configured to process changes to objects on local file system 270 of client device 150 and update local tree 250 or to make changes to local file system 270. For example, file system interface 205 can detect changes to objects in a monitored directory on local file system 270 of client device 150. Changes may also be made and detected via client application 152 of FIG. 1. File system interface 205 may make updates to local tree 250. The updates to local tree 250 may be made based on the changes (new, deleted, modified, copied, renamed, or moved objects) to objects on the client device.

Server interface 210 is configured to aid in the processing of remote changes to objects at content management system 110 and updating of remote tree 210. For example, server interface 210 can be in communication with server synchronization service 112 to synchronize changes to objects between client device 150 and content management system 110. Changes (new, deleted, modified, copied, renamed, or moved objects) to objects at content management system 110 may be detected and updates may be made to remote tree 210 to reflect the changes at content management system 110. Server interface 210 is also configured to aid in the communicating of local changes to objects at local file system 270 to server synchronization service 112 to update object database 148.

Tree storage 220 is configured to store and maintain the tree data structures used by client synchronization service 156. For example, tree storage 220 may store local tree 250, sync tree 235, and remote tree 210. In some embodiments, tree storage 220 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures in persistent memory.

Remote tree 210 represents a server state or the state of objects stored remotely from the client device (e.g., on a server of the content management system). Local tree 250 represents a file system state or the state of the corresponding objects stored locally on the client device. Sync tree 235 represents a merge base for the local tree and the remote tree. The merge base may be thought of as a common ancestor of the local tree and the remote tree or a last known synced state between the local tree and the remote tree.

Each tree data structure (e.g., remote tree 210, sync tree 235, or local tree 250) may include one or more nodes. Each node in a tree data structure may represent an object (e.g., a file, document, folder, etc.). Each node in a tree data structure may contain data such as, for example, a directory object identifier specifying the object identifier of a parent node of the object, an object name for the object, an object identifier for the object, and metadata for the object.

Planner 225 is configured to detect differences between the server state associated with content management system 110 and the file system state associated with the client device 150 based on the state of the tree data structures. For example, planner 225 may determine if there is a difference between remote tree 210 and sync tree 235. A difference between remote tree 210 and sync tree 235 indicates that an action performed remotely on one or more objects stored at content management system 110 has caused the server state and the file system state to become out of sync. Similarly, planner 225 may also determine if there is a difference between local tree 250 and the sync tree 235. A difference between local tree 250 and sync tree 235 indicates that an action performed locally on one or more objects stored in local file system 270 on client device 150 has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become outdated or no longer relevant. Scheduler 230 is configured to identify those tasks and cancel them.

When a difference exists between local tree 250 and sync tree 235, a change needs to be synchronized to content management system 110. To synchronize a change in local file system 270 to content management system 110, client synchronization service can commit an intent to server synchronization service 112 pertaining to specific synchronization operations. To commit the intent, client synchronization service 156 on client device 150 records an intent to commit an operation at client device 150. Client synchronization service 156 can record the intent to commit the operation durably on disk or memory at client device 150 to track the pending commit. Client device 150 can store dirty commit records and track modifications until an event triggers removal of the pending commit(s), such as a failure or success. Client synchronization service 156 also commits the operation to server synchronization service 112 by sending a message to server synchronization service 112 requesting to commit the operation.

Server synchronization service 112 can send a return message indicating whether the commit to content management system 110 succeeded or indicating an error. Only once client synchronization service 156 learns that the commit succeeded will client synchronization service 156 update remote tree 610 and sync tree 620 to include the synchronized operation and clear the intent to commit the operation from client device 150.

Client application 152 can learn of a change existing at a server by requesting information regarding events occurring on objects recorded in object database 148 since a last synchronization time known to the client device. In some embodiments, client synchronization service 156 makes a request for updated information periodically, or in response to receiving notifications about possible changes. When a change has occurred in the account at the content management system, server synchronization service 112 can send information about the operation that was performed to client synchronization service 156 which can update remote tree 215. Thereafter, client synchronization service 156 can detect a difference between remote tree 215 and sync tree 235 indicating that local file system 270 needs to be updated. Planner 225 can identify operations needed to update local file system 270, and server interface 210 can request any data, such as blocks making up objects, etc. from content management system 110.

Client synchronization service 156 can update local file system 270, local tree 250, and sync tree 235 to bring the system into a synchronized state. Additionally, client synchronization service 156 can store information identifying the synchronization time pertaining to the information received from object database 148 to indicate that client application is up to date to at least the last synchronization time. In some embodiments, the last synchronization time pertains to a row in object database 148, and can be stored as part of a cryptographically signed cursor that is received from content management system 110. The next time client synchronization service requests updated information, it will supply the cursor to identify a point in object database 148 from which to begin reading.

Anchor Object

In some embodiments, the content management system 110 can include functionality to generate an anchor object for an external directory that is external to a monitored directory on the client device 150. An anchor object is an object with special attributes. The client application 152 can recognize the anchor object as an object pointing to a directory that is external to a directory that is monitored by client synchronization service 156. For example, FIG. 2 illustrates an anchor object 271 in a directory monitored by client synchronization service 156, where the anchor object 271 points to an external directory external hard drive 151. While the anchor object 271 is illustrated as pointing to external hard drive 151 in FIG. 2, it should be appreciated that anchor object 271 can also point to other directories on client device 150 that are outside of the directory monitored by the synchronization service 156.

By utilizing the anchor object, the content of the external directory represented by the anchor object can be synchronized to the content management system 110. In some embodiments, the anchor object can be associated with properties that instruct client synchronization service to synchronize the objects in the external directory directly without being first stored on the client device 150.

From the perspective of the content management system 110, the external directory represented by the anchor object can be treated as if the external directory were located within the directory that contains the anchor object. The anchor object can be stored as a directory in the monitored directory and can appear with objects located underneath it as illustrated in remote tree 215.

However, from the perspective of the client synchronization service 156, the anchor object has special attributes that change some characteristics about how it is represented in local tree 250 and sync tree 235 and can change some aspects of the synchronization of objects stored in the external directory. A representation of the monitored directory can be stored in a local tree structure 250 that represents a file system structure of objects in the monitored directory, including the anchor object 271. The anchor object 271 is represented in the local tree structure as a file or special object with a flag as part of the special attributes to indicate that it is an anchor object. Likewise, any objects under the anchor object might also appear in the local tree 250 or sync tree 235 with flags or special attributes to indicate that they are part of an external directory.

In some embodiments, the special attributes of the anchor object are extended attributes or alternate data streams that describe attributes of an associated external directory. For example, the special attribute can be a Xattr that stores the location information of the associated external directory as a Binary Large Object (BLOB). The location information includes, but is not limited to a directory ID, an inode reference, a device ID, an object ID, a unique ID (UID), a target location, a path, etc. In some instances, the UID can be a universally unique ID (UUID) or globally unique ID (GUID). The special attributes can serve as a source of truth for the identification and location of the external directory and its corresponding contents.

In some embodiments, the client synchronization service 156 can recognize an anchor object by detecting the presence of its special attributes. After determining the object is a valid anchor object, the client synchronization service 156 can read the contents of the associated external directory indicated by the special attributes. Then, the client synchronization service 156 can communicate with the server synchronization service 112 to synchronize content items stored on the external directory to the content management system 110. Such synchronization of the external directory can be periodically or when certain file events occur. Such a process will be described in more detail with regard to FIGS. 3A and 3B.

In some embodiments, the special attributes such as the Xattr can enable the content management system to intercept certain user operations on the anchor object and perform predetermined actions in response. This process will be described in more detail with regard to FIGS. 3A and 3B below. For example, when a user double clicks on an anchor with Xattr including the UID of an external drive, if the external drive is accessible, the content management system can present the content of the external drive through a user interface. If the external drive in the Xattr is not accessible, the content management system can present the corresponding synchronized content of the external drive stored on the content management system.

In some embodiments, after determining the object is a valid anchor object, the server synchronization service 112 can also read the special attributes of the anchor object to create an in-memory map based on the special attributes. The in-memory map can be the source of truth in memory, such the local memory of the client device 150. In such embodiments, the client synchronization service 156 can use the in-memory map to convert between a UID of an external directory to a content management system path in the local tree structure, thus tracking the content of the external directory. Such in-memory map is updated periodically or at certain file events. Such process will be described in more detail with regard to FIG. 4.

From the perspective of a user of the client device 150, the anchor object can be represented as a folder through a user interface of the client device 150. When a user performs operations on the anchor object through a user interface on the client device 150, the user experience is the same as the interaction with any other folders on the user interface. For example, the user can open the anchor object and see its corresponding content, delete the anchor object, move the anchor object, or rename the anchor object. Such process will be described in more detail with regard to FIG. 5.

The introduction of the anchor object provides several improvements over existing technology for synchronization of content items stored externally of a client device to a content management system. First, the external content can be synchronized directly from an external location to the content management system without having to be stored locally on a client device first. Second, the anchor object provides a consistent user experience of interacting with an external directory, whether the external directory is accessible to the client device or not.

FIG. 3A illustrates an example method 300 for synchronizing an external location of a client device. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At operation 302, a client application 152 of a content management system executing on a client device may detect an external directory that is external to a synchronized directory. For example, the client application 152 illustrated in FIG. 1 may detect an external directory that is external to a synchronized directory, such as a directory monitored by client synchronization service 156 on the client device 150. The external directory can be an external hard drive connected to the client device, a network drive accessible by the client device, a folder on the client device, a file object on the client device, a camera connected to the client device, etc.

At operation 304, a client application 152 of a content management system may represent the external directory in a graphical user interface. In a first example, the client application 152 may surface a prompt presenting a message informing a user that the external directory is available for synchronization. In a second example, the representation of the external directory in the graphical user interface may be an icon representing the external directory in a list of folders or external drives accessible on the client device 150. This operation will be described in more detail with regard to FIGS. 6A and 6B.

At operation 306, a client application 152 of a content management system may receive a selection of the representation of the external directory from a user of the client device 150. This operation will be described in more detail with regard to FIGS. 6A and 6B.

At operation 308, a client application 152 of a content management system may present an option to enroll the external directory for synchronization in response to receiving the selection of the representation of the external directory. This operation will be described in more detail with regard to FIGS. 6A and 6B.

At operation 309, a client application 152 of a content management system may present an option to exclude objects on the external directory from synchronization, in response to receiving the selection of the representation of the external directory at operation 306, or along with presenting an option to enroll the external directory for synchronization at operation 308.

At operation 310, a client application 152 of a content management system may create a link to the external directory. In a first example, the link to the external directory includes special attributes that identify the link as pointing to the external directory to be synchronized. The attributes of the directory include, but are not limited to a directory ID, an inode reference, a device ID, an object ID, a UID, a target location, a path, etc. In a second example, the link is a custom object type called an anchor object. As described above with regard to FIG. 1, the anchor object is an object with special attributes. The anchor object is recognized by the client application as an object that identifies the anchor object as pointing to an external directory to be synchronized and that describes attributes of the directory. In a third example, the link is a symbolic link or a shortcut.

In some embodiments, once a link is created at operation 310, a client application of a content management system may recursively subscribe to file events of the external directory represented by the anchor object. For example, the client application 152 can detect file events of the external directory represented by the anchor object after expiration of a period of time, such as every hour, every day, or every month, etc. The client application 152 can use the detected file events of the external directory in further achieving the synchronization of the external location of the client device.

At operation 312, the client application 152 may store a link 271 created in operation 310 in the synchronized directory on the client device 150.

At operation 314, the client application 152 may represent the stored link 271 in the synchronized directory as a selectable icon. For example, the link can be represented on a user interface as a folder, an external drive, a camera, a file object, or a custom icon.

At operation 316, the client application 152 may access the external directory through the link representing the external directory.

At operation 318, the client application 152 illustrated in FIG. 1 may determine whether the external directory is a valid location after accessing the external directory. In a first example, determining that the external directory is a valid location includes determining that the external directory exists and is accessible. In a second example, determining that the external directory is a valid location includes determining that the external directory is in a supported format. The supported format can be a disk format that can be read by the client application. The supported format can also be a disk format that supports extended attributes. Example formats of an external drive include FAT32 and exFAT. In some embodiments, a format might not be fully supported if it does not support extended attributes or other mechanisms to store necessary metadata. In some embodiments, the present technology might still be able to function in a limited fashion. Unsupported formats might result in less functionality, such as unidirectional synchronization or batch backup of the external directory.

If at operation 318, the client application 152 determines that the external directory is a valid location, the process may continue with operation 320. If at operation 318, the client application 152 determines that the external directory is not a valid location, the process may end.

At operation 320, a client application of a content management system may detect at least one object on the external directory. For example, the client application 152 illustrated in FIG. 1 may detect at least one object on the external directory. The client application 152 illustrated in FIG. 1 may read metadata pertaining to the contents of the external directory and may process each object in the external directory to convert the content of each object into hashed blocks. In one example, the hashed blocks are temporarily stored in a memory of the client device 150.

In some embodiments, the client application can read metadata pertaining to the contents of the external drive, and process each object in the external directory to convert the content of each object into hashed blocks after the expiration of a period of time.

At operation 322, the client synchronization service 156 illustrated in FIG. 1 may communicate with the server synchronization service 112 to synchronize the at least one object on the external directory to the content management system without first storing the at least one object on an internal hard drive of the client device. In one example, the content management system is configured to bi-directionally synchronize contents of the synchronized directory, but the synchronizing of the external directory is a uni-directional synchronization such that changes made to objects in the external directory are synchronized to the content management system, but changes made to the objects that are represented on cloud storage of the content management system are not synchronized back to the external directory.

In some embodiments of operation 322, a client application may trigger the synchronization after expiration of a period of time as opposed to base on a file event detected in the external directory because detection of file events on some external directories can be unreliable. For example, the client synchronization service 156 illustrated in FIG. 1 may trigger the synchronization after expiration of a period of time. While it may be unreliable in some situations, it is also possible to trigger the synchronization after a file event is detected in the external directory. For example, the client synchronization service 156 illustrated in FIG. 1 may trigger the synchronization after a file event is detected in the external directory. Further, the synchronization can be triggered upon a receipt of user input requesting the synchronization. For example, the client synchronization service 156 illustrated in FIG. 1 may trigger the synchronization upon a receipt of user input requesting the synchronization.

As explained with respect to FIG. 1, synchronization of an object can include breaking the object into blocks, and prior to sending the blocks to content management system 110, the blocks can be inserted into a hash function to obtain a block identifier. The block identifier can be used to determine if the content management system 110 already has stored this block. When content management system does not already have possession over a block, the block is sent to the content management system for storage. In one example of operation 322, the synchronization further includes sending the hashed blocks that are temporarily stored in memory to the content management system 110.

At operation 324, the client application 152 may provide a user interface effective to receive user inputs to select objects within the external directory to be excluded from synchronization.

In some embodiments, operation 324 can be performed before or concurrently with operation 322.

At operation 326, the client device 150 may store the selected object to be excluded from synchronization in a hidden object.

At operation 328, the client application 152 illustrated in FIG. 1 may exclude the selected object from synchronization by the client synchronization service 156 of the client application 152 when the selected object is referenced in the hidden object.

In some embodiments, instead of performing operations 324, 326, and 328, the client application 152 may provide a user interface effective to receive user inputs to select objects within the external directory to be synchronized. For example, the user can select a set of sub-folders from an external drive to be synchronized instead of all the folders from the external drive. For another example, the user can select a set of sub-folders to be synchronized from other drives or volumes associated with the client device 150.

Figure 3B:
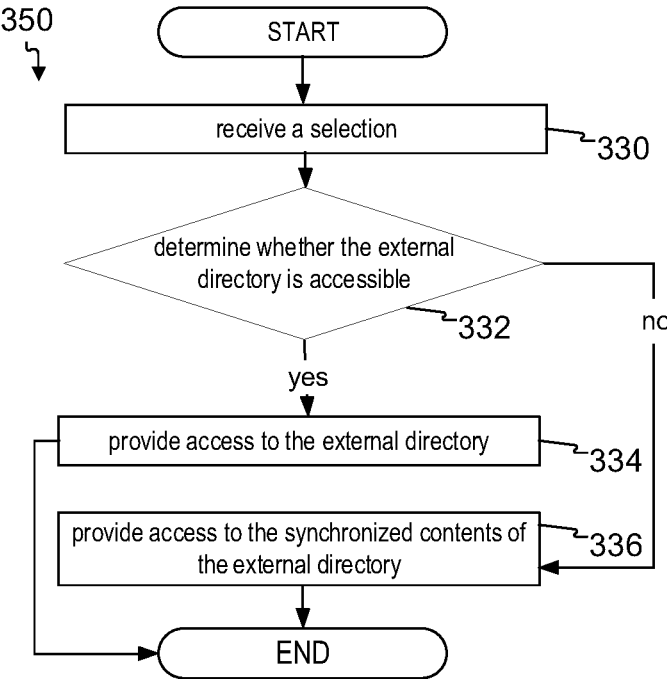
FIG. 3B is a flowchart of a method for accessing an external location of a client device through a selection of an anchor object in accordance with some embodiments.

FIG. 3B illustrates an example method 350 for access an external location of a client device through a selection of an anchor object. Although the example method 350 depicts a particular sequence of operations, the sequence may be altered without departing from the scope of the present disclosure. For example, some of the operations depicted may be performed in parallel or in a different sequence that does not materially affect the function of the method 350. In other examples, different components of an example device or system that implements the method 350 may perform functions at substantially the same time or in a specific sequence.

At operation 330, the client application 152 may receive a selection of the stored link representing the external directory through a user interface.

At operation 332, the client application 152 illustrated in FIG. 1 may determine whether the external directory is accessible.

If at operation 332, the client application 152 determines that the external directory is accessible, the process may continue with operation 334.

At operation 334, the client device 150 may provide access to the external directory.

If at operation 332, the client application 152 determines that the external directory is not accessible, the process may continue with operation 336.

At operation 336, a client application of a content management system may provide access to the synchronized contents of the external directory in a web interface of the content management system at step 334. For example, the client application 152 illustrated in FIG. 1 may provide access to the synchronized contents of the external directory in a web interface of the content management system when the external directory is not accessible. In this example, the client application 152 is providing access to the synchronized content of the external directory that is stored on the content management system 110 instead of the content stored on the external directory.

In some embodiments, the special attributes of the anchor object such as the Xattr can enable the content management system to intercept certain user operations on the anchor object, such as the selection at operation 330, and perform a predetermined action in response. For example, when a user double clicks on an anchor with Xattr including the UID of an external drive, if the external drive is accessible, the client application 152 can present the content of the external drive through a user interface at operation 334. If the external drive in the Xattr is not accessible, the client application 152 can present the corresponding synchronized content of the external drive stored on the content management system at operation 336.

In some embodiments, a server synchronization service of a content management system may convert the synchronized copy of the external directory into a link container. For example, when the synchronization of the external directory fails, the server synchronization service 112 can convert the synchronized copy of the external directory that is stored on the content management system 110 into a link container. When such conversion happens, the node representing the external directory on the local tree will be set to an ignored state, which will lead the content management system 110 and the client application 152 to ignore any further changes on such node. The node representing the external directory on the remote tree will be set to a hidden state, which will hide such node on the remote tree so that the synchronized copy of the external directory will not be shown on the user interface of the content management system 110. Other example situations that might trigger this converting process include, but are not limited to reading the content of the external directory takes too long, system failure on the client device 150, the synchronized copy of the external directory on the content management system 110 is deleted, or the external directory becomes not accessible to the client device 150 during synchronization.

Figure 4:
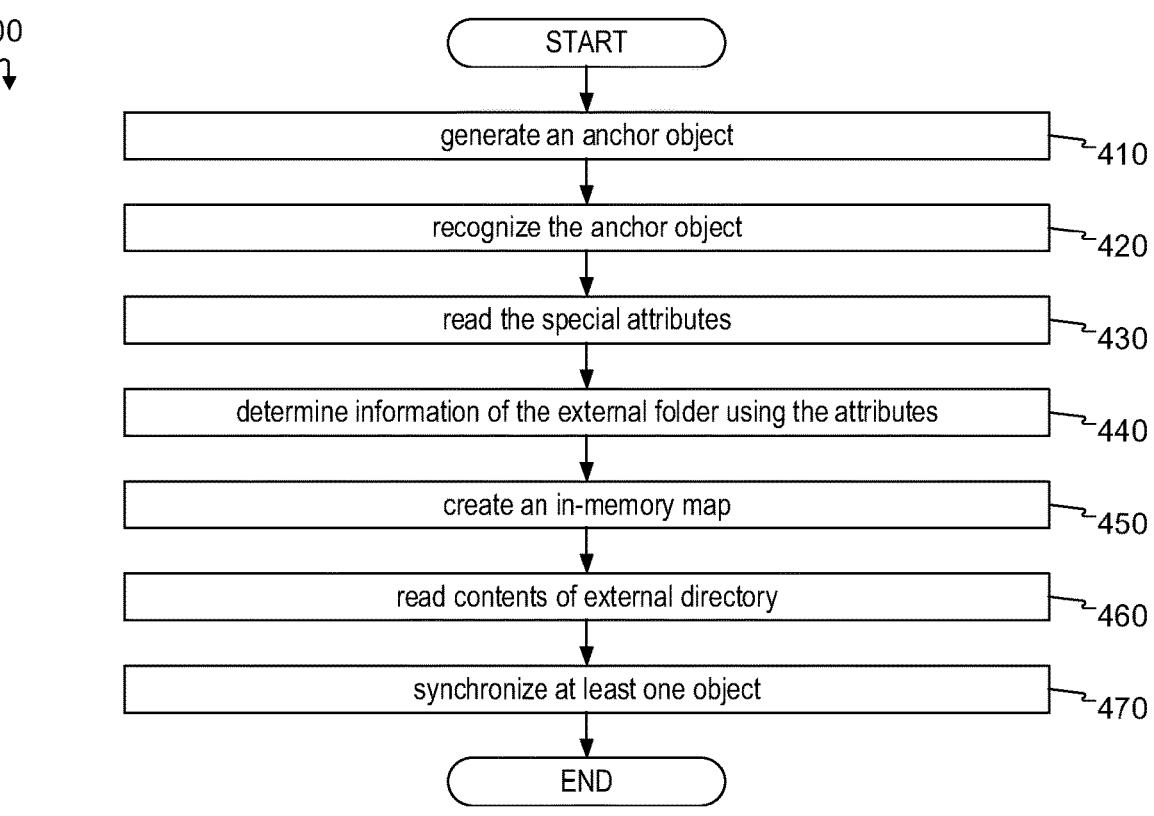
FIG. 4 is a flowchart of a method for generating an anchor object in accordance with some embodiments.

FIG. 4 illustrates an example method 400 for generating an anchor object. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At operation 410, the client application 152 may generate an anchor object for an external directory. As described above with regard to FIGS. 1 and 3A, the anchor object is an object with special attributes, a client application can recognize the anchor object as an object pointing to an external directory that is external to a directory that contains the anchor object. In this example, the client application treats the external directory as if the external directory were located within the directory that contains the anchor. The special attributes are extended attributes or alternate data streams that describe attributes of the directory. The attributes of the directory include, but are not limited to a directory ID, an inode reference, a device ID, an object ID, a UID, a target location, a path, etc.

In some embodiments, the directory that stores the anchor is a directory that is monitored by the client synchronization service 156 and its contents are synchronized to a content management system.

At operation 420, the client synchronization service 156 may recognize the anchor object. In this example, the anchor object is recognized by the presence of the special attributes.

At operation 430, the client synchronization service 156 may read the special attributes of the anchor object. In this example, the client synchronization service 156 may read metadata pertaining to the contents of the external directory and may process each object in the external directory to convert the content of each object into hashed blocks.

At operation 440, a synchronization service 156 of the client application may determine information of the external folder using the special attributes of the anchor object. For example, the client synchronization service 156 may determine the content, location information, or other information of the external folder associated with the external directory, using the special attributes of the anchor object.

At operation 450, the client synchronization service 156 may create an in-memory map for the external directory based on the special attributes to convert between a device UID of the external directory to a content management system path in the local tree. The special attributes serve as a source of truth for the identification and location of the external object.

At operation 460, the client synchronization service 156 may read the contents of the external directory.

At operation 460, the client synchronization service 156 may synchronize at least one object on the external directory to a content management system. In this example, the user can have options as to which objects should be synchronized and which objects should not be synchronized. In some embodiments, the synchronization of operation 460 is unidirectional from the external directory to the content management system 110. In some embodiments, the synchronization operation is bi-direction between the external directory and the content management system 110.

Figure 5:
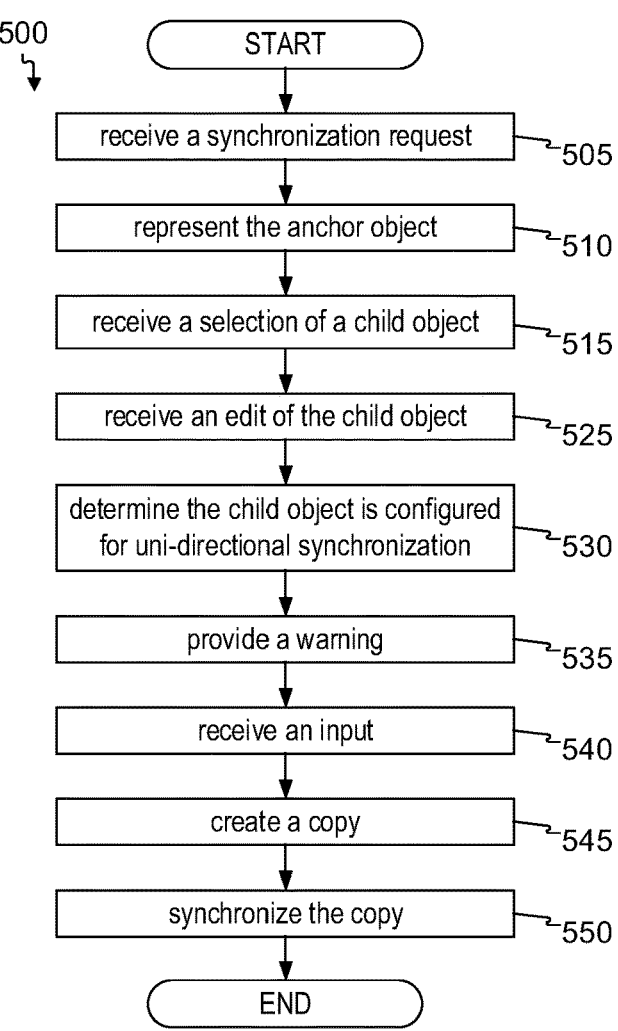
FIG. 5 is a flowchart of a method for synchronizing an anchor object in accordance with some embodiments.

FIG. 5 illustrates an example method 500 for handling and synchronizing an external directory by a content management system server. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At operation 505, the server synchronization service 112 may receive a synchronization of an anchor object by a content management system from a first client device. In one example, as described above with regard to FIGS. 1, 3A, and 4, the anchor object is an object with special attributes, the anchor object is recognized by the content management system as an object that points to an external directory reachable by the first client device. In this example, the external directory is external to a directory on the first client device that contains the anchor object.

At operation 510, the web interface service 124 illustrated in FIG. 1 may represent the anchor object as a folder within the directory that contains the anchor object. For example, child objects of the anchor object are also represented as being in a path consisting of the directory that contains the anchor object. The anchor object and the child objects are browseable and viewable on the web server of the content management system. In another example, the anchor object and the child objects are browseable and viewable on the file browser of a client device, such as a smartphone or a personal computer.

In some embodiments, the anchor object and its child objects are configured for uni-directional synchronization, whereas, the content management system supports bi-directional synchronization of objects by default. However, a person of ordinary skill in the art would also appreciate that the anchor object and its child objects can be configured for bi-directional synchronization too.

At operation 515, the web interface service 124 illustrated in FIG. 1 may receive a selection of a child object in the path of the anchor object via the web server of the content management system.

At operation 525, the web interface service 124 may receive an edit of the child object via the web server of the content management system. In some embodiments, such an edit of the child object can be made on a client application of a second client device.

At operation 530, the server synchronization service 112 illustrated in FIG. 1 may determine that the child object is configured for uni-directional synchronization. For example, the server synchronization service 112 may determine that the child object is configured for uni-directional synchronization by determining that the child object is in a path having the anchor object as an ancestor in the object path. In another example, the server synchronization service 112 may determine that the child object is configured for uni-directional synchronization by determining that the child object is associated with a special attribute indicating that the object is configured for uni-directional synchronization.

At operation 535, the web interface service 124 may provide a warning that the child object is configured for uni-directional synchronization.

At operation 540, the web interface service 124 may receive an input from a user confirming that the user would like to synchronize the edit.

At operation 545, the server synchronization service 112 illustrated in FIG. 1 may create a copy of the child object containing the edit. In this example, the copy of the child object can be first stored on the content management system 110 under a directory associated with the client device 150 other than the external directory, e.g., a user account directory, or other directory.

At operation 550, the server synchronization service 112 may synchronize the copy of the child object into a directory that supports bi-directional synchronization. In this example, the server synchronization service 112 may not synchronize the copy into the external directory.

At operation 550, the server synchronization service 112 may synchronize the anchor object to a second client device. In one example, the anchor object is represented as a link placeholder on a file system of the second client device. In a second example, upon being selected at the second client device, the link placeholder is configured to cause the second client device to direct a web browser to the webserver of the content management system.

In some embodiments, because the child object is configured for uni-directional synchronization, the edit will not be synchronized back to the original copy of the child object. For example, if the child object is a child object of an external drive that is represented by the anchor object, the edit of the child object received from the content management system will not be synchronized back to the original copy of the child object that is stored on the external drive. Instead, example method 500 helps to preserve the edit in the content management system by creating and storing another copy of the child object with the edit.

Figure 6A:
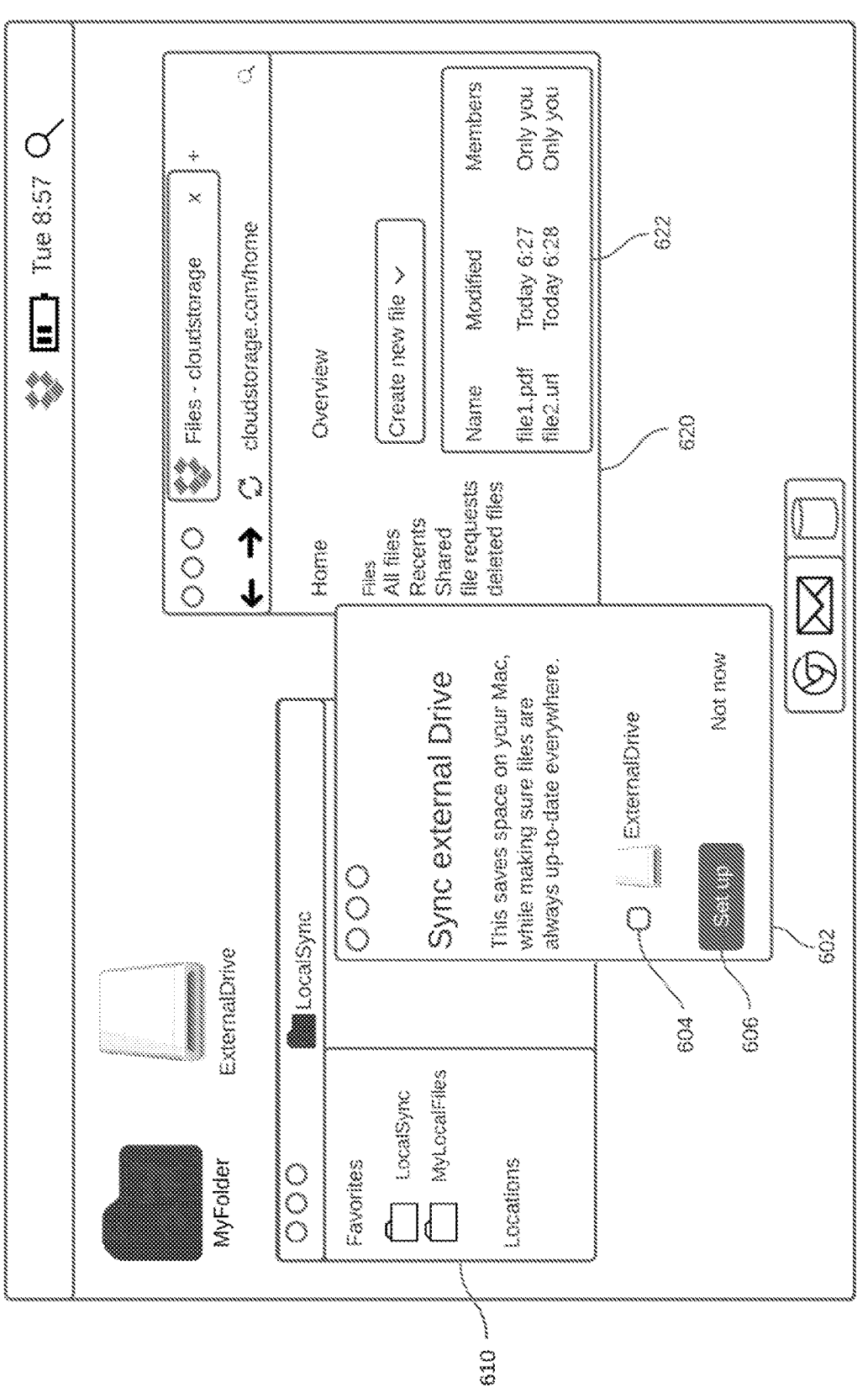
FIG. 6A shows an example graphical user interface in accordance with some embodiments.

FIG. 6A shows an example graphical user interface in accordance with some embodiments. Graphical user interface includes window 602, a local sync folder 610, and a web interface 620. The window 602 is displayed in response to an external drive being connected to the client device 150. Window 602 includes selectable interface elements 604 and 606. The local sync folder 610 is a directory on client device 150 that is monitored by client application 152 associated with content management system 110. The contents of local sync folder 610 can be synchronized with the content management system 110. In this example, the local sync folder 610 is empty.

The web interface 620 presents a web view of content management system 110. In this example, the web interface 620 includes a file selection interface 622 that shows the files stored on the content management system 110.

As described with regard to FIG. 3A, client application 152 of the content management system 110 may present the external drive as a selectable interface element 604 representing the external drive. The client application 152 may receive a selection of the selectable interface element 604 from a user. The client application 152 may also present an option (selectable interface element 606) to enroll the external drive for synchronization with the content management system 110.

Figure 6B:
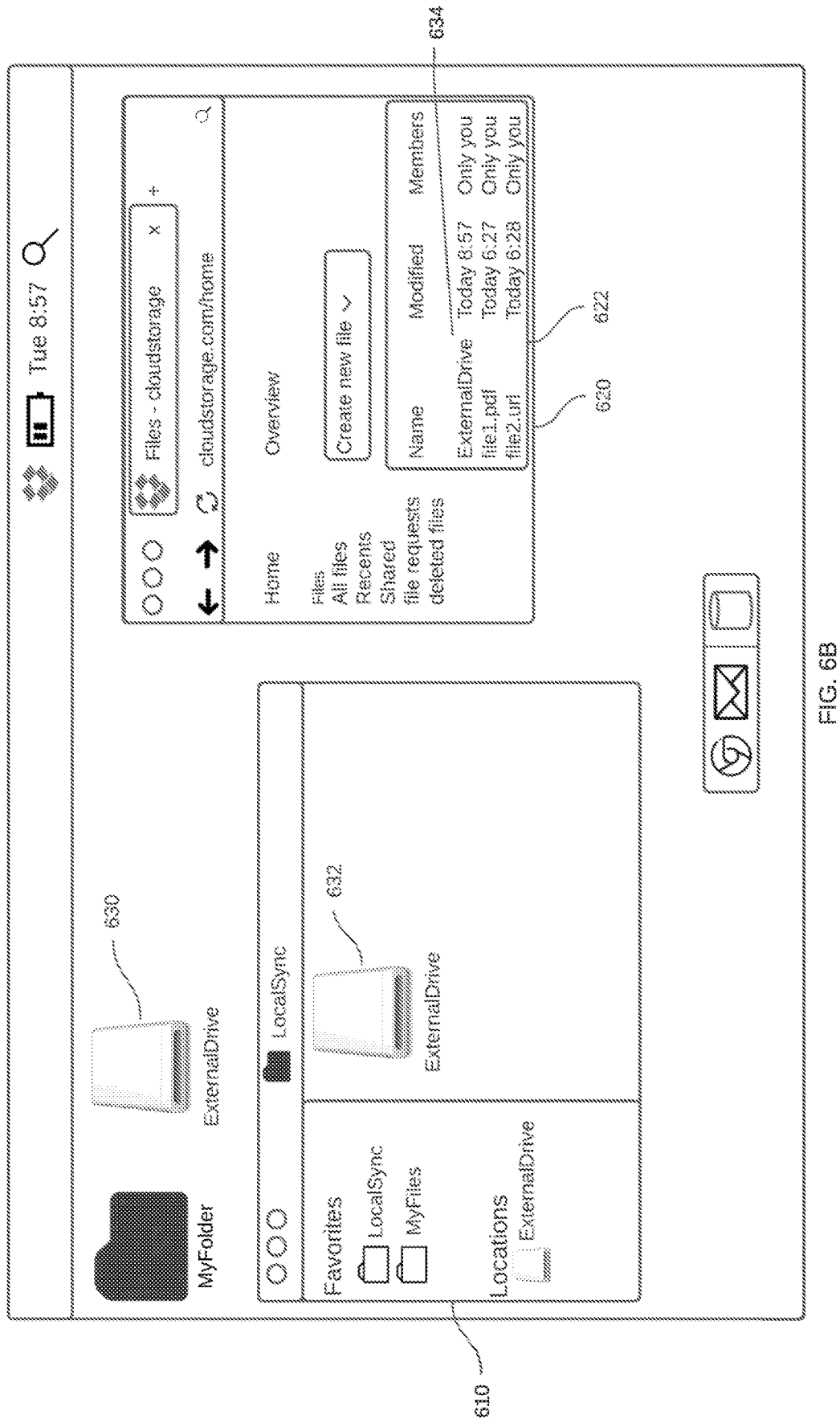
FIG. 6B shows an example graphical user interface in accordance with some embodiments.

FIG. 6B shows another example graphical user interface in accordance with some embodiments. As described with regard to FIG. 3A, once a user selected both the selectable interface elements 604 and 606, the client synchronization service 156 may begin communicating with the server synchronization service 112 to synchronize the contents on the external directory to the content management system 110 without first storing the contents on an internal hard drive of the client device 150. The details of the synchronization are described in FIG. 3A.

After the synchronization is completed, interface elements will show up in the graphical user interface illustrated in FIG. 6B. For example, interface element 632 will show up in the local sync folder 610, and interface element 634 shows up in the file selection interface 622 of the web interface 620. Interface elements 630, 632, and 634 all represent the external drive in these different locations. In this example, interface element 632 is an anchor object as described with regard to FIG. 2. A user can access the external drive by selecting any one of the interface elements 630, 632, and 634. This user interface design provides a consistent user experience when interacting with the external drive, even though the contents of the external drive are not stored on the internal hard drive of the client device 150.

Figure 6C:
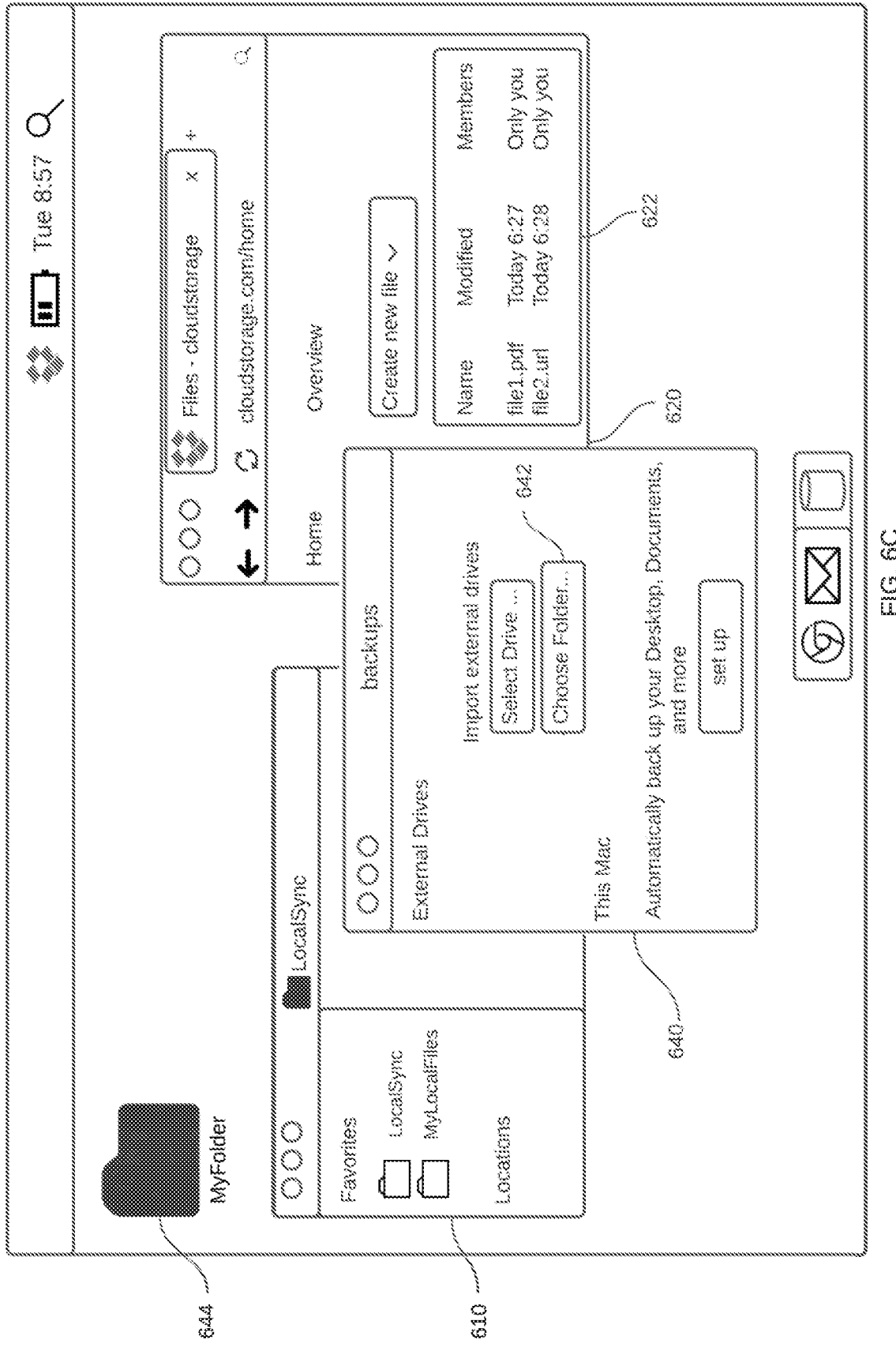
FIG. 6C shows an example graphical user interface in accordance with some embodiments.

FIG. 6C shows another example graphical user interface in accordance with some embodiments. The graphical user interface includes a window 640. The window 640 includes interface element 642. In this example, a user can select the interface element 642 and then select any local folders, such as local folder 644, to be backed up to the content management system 110. To receive selection of the local folders, the client application 152 may present another window including all the local folders after the user selects the interface element 642.

Figure 6D:
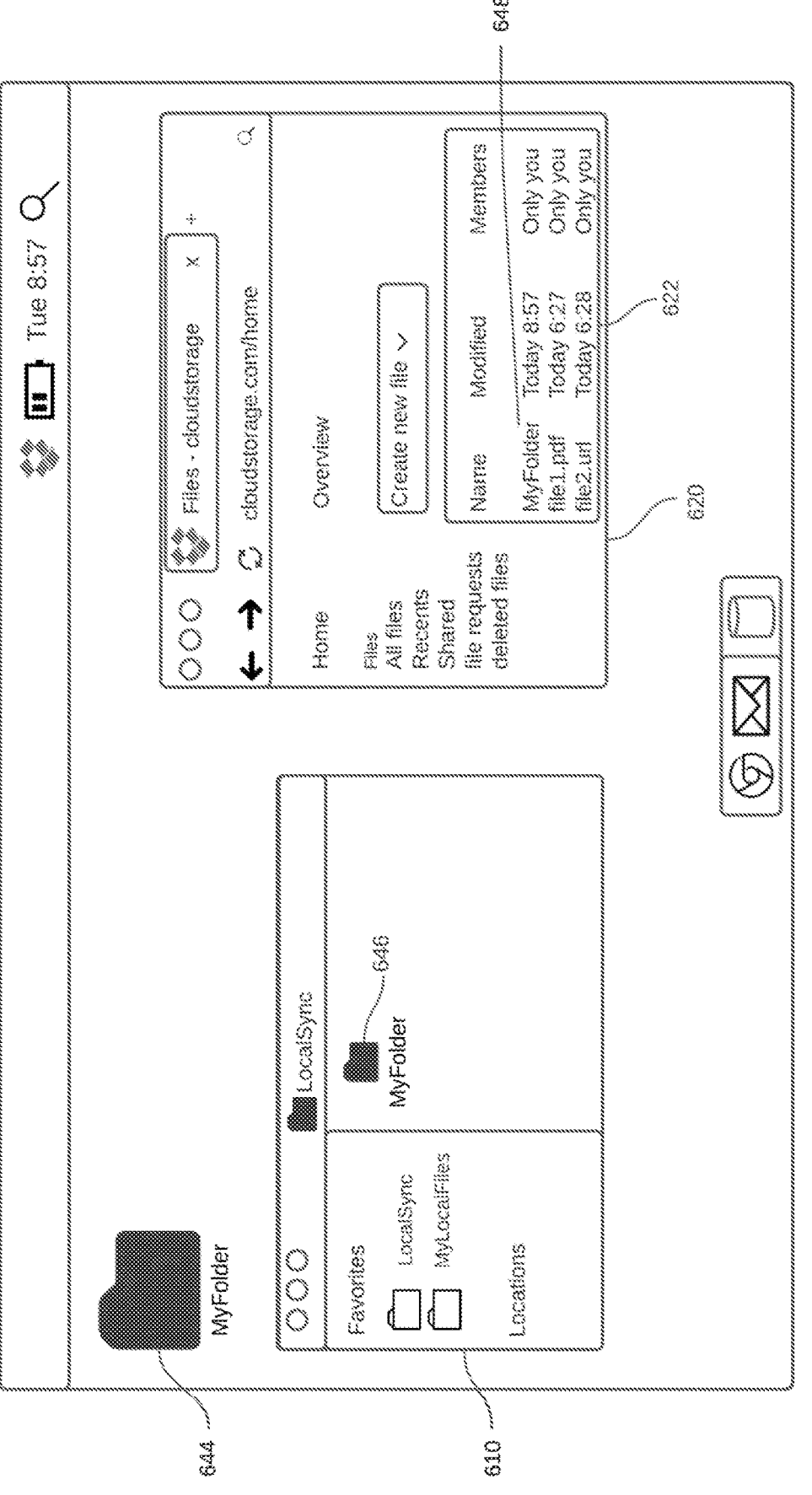
FIG. 6D shows an example graphical user interface in accordance with some embodiments.

FIG. 6D shows another example graphical user interface in accordance with some embodiments. After a selection of a local folder such as the local folder 644 is received, the client synchronization service 156 may begin communicating with the server synchronization service 112 to synchronize the contents on the selected local folder to the content management system 110. The detail of the synchronization is described in detail with regard to FIG. 3A.

After the synchronization is completed, interface element 646 representing the local folder 644 shows up in the local sync folder 610. Also, interface element 648 shows up in the file selection interface 622 of the web interface 620. A user can access the contents of the local folder 644 by selecting any one of the interface elements 644, 646, and 648.

Figure 7:
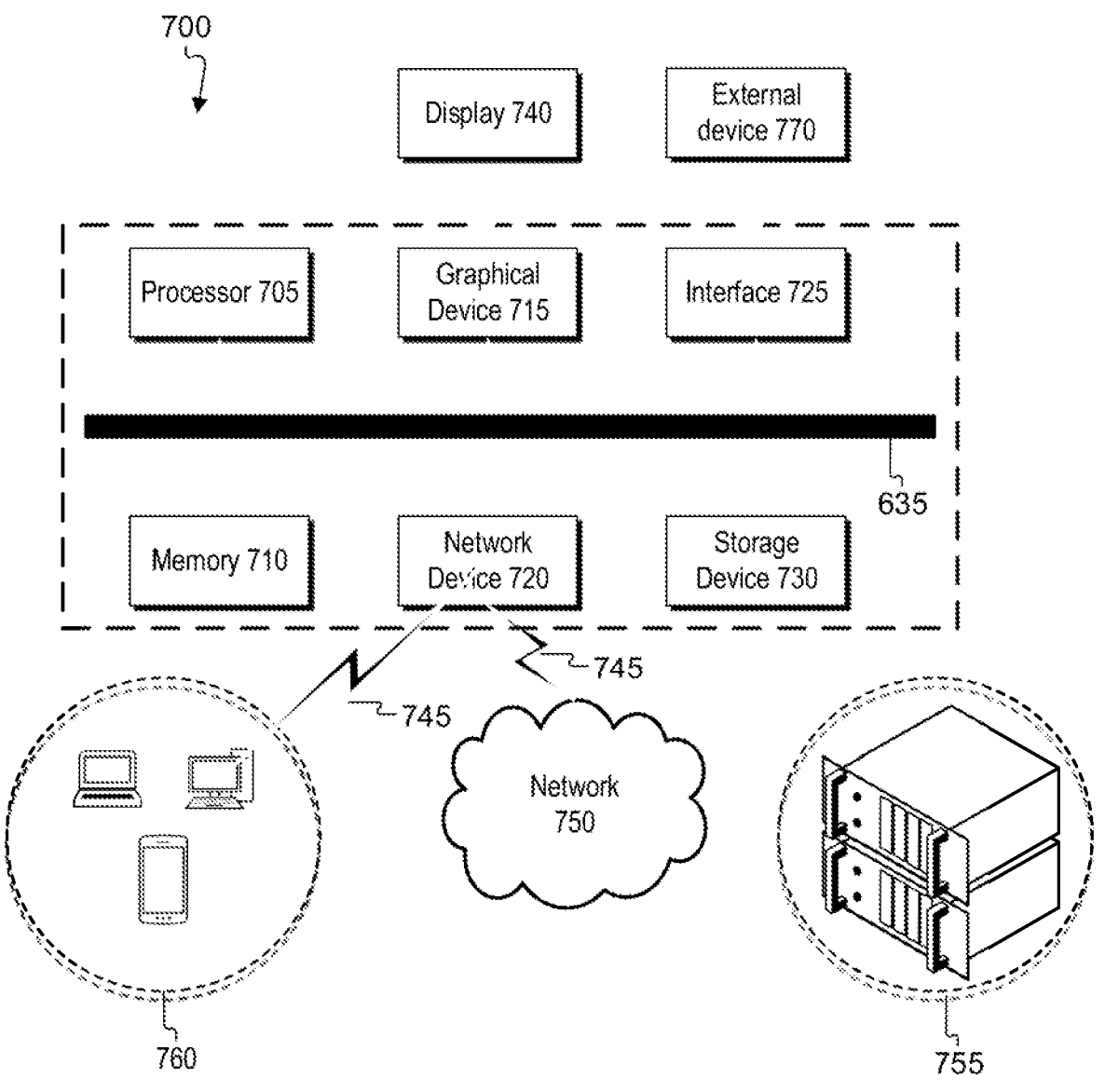
FIG. 7 illustrates an example computer system in accor-dance with some embodiments.

FIG. 7 illustrates an example computer system 700 for implementing a part of the instant disclosure. For example, the example computer system 700 may execute a client application for performing the instant disclosure.

The example computer system 700 includes a processor 705, a memory 710, a graphical device 715, a network device 720, interface 725, and a storage device 730 that are connected to operate via a bus 735. The processor 705 reads machine instructions (e.g., reduced instruction set (RISC), complex instruction set (CISC), etc.) that are loaded into the memory 710 via a bootstrapping process and executes an operating system (OS) for executing application within frameworks provided by the OS. For example, the processor 705 may execute an application that executes an application provided by a graphical framework such as Winforms, Windows Presentation Foundation (WPF), Windows User Interface (WinUI), or a cross-platform user interface such as Xamarin or QT. In other examples, the processor 705 may execute an application that is written for a sandbox environment such as a web browser.

The processor 705 controls the memory 710 to store instructions, user data, OS content, and other content that cannot be stored within the processor 705 internally (e.g., within the various caches). The processor 705 may also control a graphical device 715 (e.g., a graphical processor) that outputs graphical content to a display 740. In some examples, the graphical device 715 may be integral within the processor 705. In yet another example, the display 740 may be integral with the computer system 700 (e.g., a laptop, a tablet, a phone, etc.).

The graphical device 715 may be optimized to perform floating-point operations such as graphical computations, and may be configured to execute other operations in place of the processor 705. For example, controlled by instructions to perform mathematical operations optimized for floating point math. For example, the processor 705 may allocate instructions to the graphical device 715 for operations that are optimized for the graphical device 715. For instance, the graphical device 715 may execute operations related to artificial intelligence (AI), natural language processing (NLP), vector math. The results may be returned to the processor 705. In another example, the application executing in the processor 705 may provide instructions to cause the processor 705 to request the graphical device 715 to perform the operations. In other examples, the graphical device 715 may return the processing results to another computer system (i.e., distributed computing).

The processor 705 may also control a network device 720 for transmits and receives data using a plurality of wireless channels 745 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 720 may wirelessly connect to a network 750 to connect to servers 755 or other service provider. The network device 720 may also be connected to the network 750 via a physical (i.e., circuit) connection. The network device 720 may also directly connect to local electronic device 760 using a point-to-point (P2P) or a short-range radio connection.

The processor 705 may also control an interface 725 that connects with an external device 770 for bidirectional or unidirectional communication. The interface 725 is any suitable interface that forms a circuit connection and can be implemented by any suitable interface (e.g., universal serial bus (USB), Thunderbolt, and so forth). The external device 765 is able to receive data from the interface 725 to process the data or perform functions for different applications executing in the processor 705. For example, the external device 765 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

What is claimed is:

1. A method comprising:
detecting, by a client application of a content management system executing on a client device, a directory on the client device, wherein the content management system can support uni-directional synchronization and bi-directional synchronization and wherein the directory is associated with at least one special attribute designating the directory for a specific synchronization behavior, wherein the at least one special attribute of the directory designate to the content management system that the directory is configured for the uni-directional synchronization;
associating the directory with a user account of the content management system corresponding to the client device; and
providing at least one object in the directory to the content management system, in accordance with the at least one special attribute, without first storing the at least one object on an internal storage of the client device.

2. The method of claim 1, comprising:
determining that the directory is a valid location when the directory supports extended attributes or alternate data streams, wherein the at least one special attribute is stored in the extended attributes or the alternate data streams.

3. The method of claim 1, comprising:
representing the directory in a local tree structure for use by the content management system in tracking synchronization states, wherein the directory is represented with a flag to indicate the at least one special attribute.

4. The method of claim 3, comprising:
creating an in-memory map based on the at least one special attribute, wherein the in-memory map maps a UID of the directory to a content management system path in the local tree structure.

5. The method of claim 3, comprising:

providing a user interface effective to receive user inputs to select objects within the directory to be excluded from being provided to the content management system;

storing a selected object to be excluded from being provided to the content management system in a hidden object in the local tree structure; and excluding the selected object from being provided to the content management system when the selected object is referenced in the hidden object.

6. The method of claim 1, wherein the at least one special attribute includes location information of the directory as a Binary Large Object (BLOB), wherein the location information includes at least one of a directory ID, an inode reference, a device ID, an object ID, a unique ID (UID), a target location, a path.

7. The method of claim 1, comprising:

detecting a user input selecting a link representing the directory;

interrupting an action corresponding to the user input selecting the link based on an extended attribute associated with the directory; and in response to determining that the directory is not available on the client device, executing a function to view the at least one object within the directory from the content management system.

8. A non-transitory computer readable medium comprising instructions stored thereon, the instructions, when executed by at least one processor are effective to cause the at least one processor to:

detect, by a client application of a content management system executing on a client device, a directory on the client device that is associated with at least one special attribute designating the directory for a uni-directional synchronization, wherein the client application and the content management system are capable of supporting the uni-directional synchronization and bi-directional synchronization;

associate the directory with a user account of the content management system corresponding to the client device; and provide at least one object in the directory to the content management system for the uni-directional synchronization.

9. The non-transitory computer readable medium of claim 8, wherein the instructions are further effective to cause the at least one processor to:

represent the directory in a local tree structure for use by the content management system in tracking synchronization states, wherein the directory is represented as with a flag to indicate the at least one special attribute.

10. The non-transitory computer readable medium of claim 9, wherein the instructions are further effective to cause the at least one processor to:

create an in-memory map based on the at least one special attribute, wherein the in-memory map converts between a UID of the directory to a content management system path in the local tree structure.

11. The non-transitory computer readable medium of claim 9, wherein the instructions are further effective to cause the at least one processor to:

provide a user interface effective to receive user inputs to select objects within the directory to be excluded from being provided to the content management system;

store a selected object to be excluded from being provided to the content management system in a hidden object in the local tree structure; and exclude the selected object from being provided to the content management system when the selected object is referenced in the hidden object.

12. The non-transitory computer readable medium of claim 8, wherein the directory is an external directory.

13. The non-transitory computer readable medium of claim 8, wherein the instructions are further effective to cause the at least one processor to:

detect a user input selecting a link representing the directory;

interrupt an action corresponding to the user input on the link based on an extended attribute associated with the directory; and determine that the directory is not available on the client device, executing a function to view the at least one object within the directory from the content management system.

14. A system comprising:

at least one storage configured to store instructions;

at least one processor configured to execute the instructions and cause the at least one processor to:

receive a communication to synchronize an object by a content management system from a first client device, wherein the content management system can support uni-directional synchronization and bi-directional synchronization, the object has attributes that causes the content management system to recognize the object as pointing to a directory reachable by the first client device and wherein the attributes of the object designate to the content management system that the object is configured for the uni-directional synchronization and represent the object as a folder on a web server of the content management system, wherein child objects of the object are represented as being in a path subordinate to the object; and and synchronize the directory and at least one child object in the directory without first storing the at least one child object on an internal storage of the first client device.

15. The system of claim 14, wherein the instructions are further effective to cause the at least one processor to:

synchronize the object to a second client device, wherein the object is represented as a link placeholder on a second file system of the second client device, wherein the directory is not reachable by the second client device.

16. The system of claim 14, wherein the instructions are further effective to cause the at least one processor to:

receive an edit to the at least one child object via the web server of the content management system;

determining that the at least one child object is configured for the uni-directional synchronization;

providing a warning that the at least one child object is configured for the uni-directional synchronization; and receiving an input confirming that a user account would like to synchronize the edit.

17. The system of claim 16, wherein the instructions are further effective to cause the at least one processor to:

create a copy of the at least one child object containing the edit; and synchronize the copy of the at least one child object into a second directory that supports bi-directional synchronization, the second directory being different than the directory.

* * * * *